United States Patent [19]  
Shimuzu et al.

[11] Patent Number: 4,836,966  
[45] Date of Patent: Jun. 6, 1989

[54] BINDER FOR CERAMICS

[76] Inventors: Isoo Shimuzu, 29-113 Nagahama, Kanzawa-ku, Yokohama-shi, Kanagawa-ken; Yasuo Matsumura, 3-35-4 Ohkubo, Konan-ku, Yokohama-shi, Kanagawa-ken; Yoshihisa Inomata, 1-6-1205 Kawaracho, Saiwai-ku, Kawasaki-shi, Kanagawa-ken, all of Japan

[21] Appl. No.: 168,863

[22] Filed: Mar. 16, 1988

Related U.S. Application Data

[63] Continuation-in-part of Ser. No. 924,143, Oct. 27, 1986, abandoned, which is a continuation of Ser. No. 711,992, Mar. 14, 1985, abandoned.

[30] Foreign Application Priority Data

Mar. 15, 1984 [JP] Japan .................................. 59-49462  
Oct. 23, 1984 [JP] Japan ................................. 59-222389

[51] Int. Cl.$^4$ ............................................. C04B 33/13  
[52] U.S. Cl. ...................................... 264/63; 264/86; 525/329.9; 524/430; 524/558  
[58] Field of Search ...................... 264/63; 525/329.9; 524/558, 430; 523/139

[56] References Cited

U.S. PATENT DOCUMENTS

| Re. 31,936 | 7/1985 | Sperry ..................... 524/558 |
| 2,244,703 | 6/1941 | Hubbuch .................. 525/329.9 |
| 3,953,643 | 4/1976 | Cheung ................... 525/329.9 |
| 4,010,133 | 3/1977 | Nakayama ................. 501/139 |
| 4,339,365 | 7/1982 | Becher ..................... 525/328.8 |
| 4,351,754 | 9/1982 | Dupré524 ..................... 558/ |
| 4,374,939 | 2/1983 | Fisk ........................ 523/139 |

FOREIGN PATENT DOCUMENTS

| 58-167640 | 10/1983 | Japan ..................... 525/329.9 |
| 2033400 | 5/1980 | United Kingdom ........... 525/329.9 |

*Primary Examiner*—C. Warren Ivy  
*Attorney, Agent, or Firm*—Ostrolenk, Faber, Gerb & Soffen

[57] ABSTRACT

The present invention is directed to a water-soluble organic binder suitable for a ceramic molding method in which a ceramic slurry containing water as a dispersion medium is utilized and with this binder, a ceramic sheet can be prepared which has smooth surfaces, contains no flocculating material, and possesses excellent flexibility and mechanical strength.

11 Claims, No Drawings

BINDER FOR CERAMICS

CROSS REFERENCE TO EARLIER APPLICATION

This application is a continuation-in-part application Ser. No. 924,143, filed Oct. 27, 1986, which was a continuation of application Ser. No. 711,992, filed Mar. 14, 1985 and both now abandoned.

BACKGROUND OF THE INVENTION

1. Field of the Invention

The present invention relates to a water-soluble organic binder used in molding ceramics. The present invention also relates to a method for producing ceramics which are sintered products.

2. Brief Description of the Prior Art

As one molding method of ceramic products which are produced by sintering raw sheets or green sheets comprising sinterable fine inorganic oxide powder such as alumina, silica, magnesia and beryllia, there is a sheet molding method which comprises mixing a fine sinterable powder and a solvent to prepare a slurry, applying the latter in the form of a sheet by use of a doctor blade or the like, and thermally drying to obtain a raw sheet or green sheet. The thus obtained sheet is afterward, for example, punched to be formed into a desired shape, followed by sintering. The organic binder contained in the green sheet is extinguished by firing in the course of sintering. In this case, therefore, the organic binder is employed so as to retain the given shape until the sintering finishes, in particular during the punching.

For example, in the conventional sheet molding method, an organic binder such as a butyral resin or a vinyl acetate resin is dissolved in an organic solvent such as methyl ethyl ketone, butyl acetate, ethyl acetate, toluene or an alcohol, and the resultant solution is then mixed with a sinterable fine powder over a long period of time in order to form a slurry. After deaeration, the slurry is applied onto a carrier film such as polyester film by means of a blade in the form of a sheet having a predetermined thickness, and it is heated for drying or naturally dried to prepare a sheet (a raw sheet or green sheet).

However, this method in which the organic solvent is used involves problems of (1) harm of the organic solvent to a human health, (2) danger such as explosion due to employment of the flammable organic solvent, and (3) being uneconomical owing to utilization of the expensive organic solvent.

Hence, with the intention of overcoming the abovementioned drawbacks, some additional methods have been suggested in which there are employed water-soluble organic binders such as polyvinyl alcohols and polyvinyl acetates, and aqueous emulsions, as binders, such as emulsions of polyacrylates and copolymers of ethylenes and organic acids.

For example, in U.S. Pat. No. 4,010,133, an acrylate copolymer of 50 to 7% alkyl acrylate ester, 20 to 50% alkyl methacrylate ester, and 0.2 to 2% acrylic acid and methacrylic acid is used as an organic polymeric binder to prepare an aqueous slurry of a barium titanate powder, and from the slurry, the green sheet is prepared.

These suggested methods an solve the abovementioned problems (1), (2) and (3) because water is used as the solvent, but they instead have brought about other problems. For example, in longtime mixing of the sinterable fine powder, the latter will tend to coagulate in the slurry due to the presence of water, and the viscosity of the slurry will thus deviate from Newtonian flow, with the result that fluidity of the slurry and dispersion of the powder will deteriorate and it will be difficult to prepare the sheet having a high density and smooth surfaces. Further, in such methods above, a sheet having a good flexibility and a great mechanical strength is scarcely manufactured.

That is to say, essential requirements for the ceramic sheet molding, in addition to consideration of the above-mentioned factors (1), (2) and (3), are:

(4) that the dried ceramic sheet has smooth surfaces and high density;

(5) that the molded sheet has a proper flexibility and mechanical strength for the sake of subsequent press lamination and tape winding; and (6) that the molded sheet can easily revert to its original slurry.

However, in the case of the emulsion type organic binder, it is hard to recycle to the slurry. Accordingly, the manner of using such a binder type can be concluded to be unsuitable for sheet molding.

On the contrary, the molding method of using a water soluble organic binder and water as a solvent is preferred because reproduction of the slurry is possible.

However, with regard to a polymer containing a carboxylic acid such as acrylic acid, which is often employed as the water-soluble organic binder, its carboxylic acid group (carboxyl group) is neutralized with an alkali such as sodium hydroxide or potassium hydroxide, or ammonia to impart the water-soluble property. It is here to be noted that such a neutralization will disadvantageously prevent the production of the flexible sheet.

Becher et al., in U.S. Pat. No. 4,339,365, discloses a coating composition containing an acrylate copolymer of acrylic acid. The use of the copolymer as a binder, however, is not disclosed therein.

In ceramic sheet molding, it is also important for the organic binder to be easily decomposed during sintering. The organic binder of the present invention is easily decomposed with no carbon deposit when fired.

SUMMARY OF THE INVENTION

An object of the present invention is to provide a water-soluble organic binder suitable for a ceramic molding method in which a sinterable powder slurry containing water as a solvent is utilized, and from this binder, a green sheet can be prepared which has smooth surfaces, contains no flocculating material, and possesses excellent flexibility, mechanical strength and high density.

That is to say, the present invention is concerned with a water-soluble binder for ceramics characterized by comprising a copolymer prepared by copolymerizing (A) 5 to 45 mol % of at least one of $\alpha,\beta$-unsaturated carboxylic acid consisting substantially of acrylic acid and methacrylic acid, (B) 1 to 95 mol % of at least one vinyl compound and (C) 0 to 54 mol % of at least one $\alpha,\beta$-unsaturated carboxylate selected from acrylates and methacrylates containing hydroxyl groups, at least 85 mol % of carboxyl groups contained in the copolymer being neutralized with a tertiary amine in which the total number of carbon atoms contained in three substituents thereof is within the range of 6 to 9.

When applying the binder of the present invention to a ceramic-molding technique in which water is employed as a solvent, especially to a sheet molding technique, a green sheet can be prepared which has smooth surfaces and a high density, is flexible and is excellent in mechanical strength.

Moreover, the prepared green sheet is capable enough of being reproduced, which fact will lead to the improvement in yield advantageously.

The sintered sheet has also smooth surfaces and a high density when the thus prepared green sheet is sintered by firing.

DETAILED DESCRIPTION OF THE INVENTION

In the copolymer of the present invention, the $\alpha,\beta$-unsaturated carboxylic acid (A) comprising acrylic acid or methacrylic acid is copolymerized so as to be 5 to 45 mol %. Acrylic acid and methacrylic acid may be used singly or in combination and copolymerized.

When the copolymerization ratio of the $\alpha,\beta$-unsaturated carboxylic acid is less than 5 mol %, a binder for ceramics will not be completely water-soluble and a uniform aqueous slurry will be hard to obtain therefrom. Further, in the case that the slurry is reproduced from a molded sheet containing such a binder, the sheet cannot revert to the uniform aqueous slurry. On the contrary, when the copolymerization ratio is more than 45 mol %, ionization of the binder for ceramics will increase, namely the cohesive power of the binder will increase too much, and the sinterable fine powder particles will thus agglomerate with each other at the step of longtime grinding and mixing the binder and the sinterable fine powder together for a long time, so that no uniformity of the aqueous slurry will be provided and no flexibility will be present in the molded sheet of the final product disadvantageously.

One of the vinyl compounds (B) which will be copolymerized with the above-mentioned unsaturated carboxylic acids (A) is an acrylate or a methacrylate represented by the formula

wherein $R_1$ is a hydrogen atom or a methyl group and $R_2$ is an alkyl group having 1 to 18 carbon atoms.

This acrylate or methacrylate is an ester of acrylic acid or methacrylic acid and a monoalcohol having 1 to 18 carbon atoms, preferably having 1 to 11 carbon atoms. When the ester is prepared from a monoalcohol having too many carbon atoms, the copolymer will be poor in water-solubility and will be liable to gel under cold conditions, which facts will render its handling troublesome. For example, the gelled copolymer will have to be dissolved again by heating at the time of its use.

Examples of such monoalcohols which will constitute the ester include alkane mono-ols such as methanol, ethanol, isopropanol, n-propanol, sec-butanol, iso-butanol, n-butanol, iso-amyl alcohol, n-amyl alcohol, iso-hexyl alcohol, n-hexyl alcohol, 2-ethylhexyl alcohol and octyl alcohol. Their acrylates or methacrylates may be used alone or in a combination thereof.

Another monomer (B) which will take part in the copolymerization is a vinyl compound represented by the formula (II)

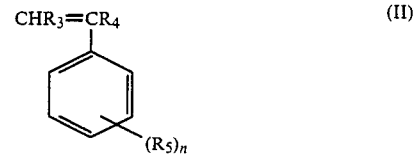

wherein each of $R_3$, $R_4$ and $R_5$ is a hydrogen atom, a methyl group or an ethyl group, and the total number of carbon atoms of $R_3$, $R_4$ and $(R_5)_n$ is 2 or less and n is an integer of 0 to 2.

Examples of the vinyl compounds include styrene and styrenes substituted by methyl or ethyl groups such as styrene, $\alpha$-methylstyrene, $\beta$-methylstyrene, $\alpha$-ethylstyrene, $\beta$-ethylstyrene, $\alpha,\beta$-dimethylstyrene, vinyltoluene, ethylstyrene and vinylxylene. These vinyl compounds may be used alone or in a combination thereof. The above-mentioned vinyl compound is copolymerized so as to be 1 to 95 mol %, preferably 1 to 94 mol %.

Further, the acrylate or the methacrylate having the above formula (I) and the styrenes having the formula (II) may be used separately or in combination.

A monomer (C) which will take part in the copolymerization in the present invention is at least one $\alpha,\beta$-unsaturated carboxylate selected from acrylates and methacrylates containing hydroxyl groups represented by the formula (III)

wherein $R_6$ is a hydrogen atom or a methyl group and $R_7$ is a hydroxyalkyl group having 2 to 4 carbon atoms.

Examples of the $\alpha,\beta$-unsaturated carboxylates (C) represented by the aforesaid formula (III) of the present invention include 2-hydroxyethyl acrylate, 2-hydroxyethyl methacrylate, 2-hydroxypropyl acrylate and 2-hydroxypropyl methacrylate, and they may be used alone or in the form of a mixture thereof. This acrylate or methacrylate having hydroxyl groups is copolymerized so as to be 56 mol % or less in the copolymer. Namely, this comonomer is copolymerized in an amount of 0 to 54 mol %, preferably 0 to 40 mol %, and most preferably 1 to 40 mol %.

The above-mentioned $\alpha,\beta$-unsaturated carboxylate having hydroxyl groups will be copolymerized to improve mechanical strength of the green sheet, but when its copolymerization ratio is in excess of 54 mol %, the green sheet will be too strong and some cracks will be disadvantageously apt to occur in the sheet upon winding.

The copolymer of the present invention can be obtained by copolymerizing the aforementioned monomers using a polymerization initiator in an ordinary manner.

This copolymerization can be accomplished suitably by selecting the ordinary solution copolymerization manner, but in view of the increase in viscosity with the progress of the copolymerization and the removal of polymerization heat generated at the copolymerization, it is preferred to use a polymerizing solvent. Such solvents may be suitably selected, but are preferably water-soluble from the viewpoint of the usage of the organic binder. In other words, if mixed with the ceramic fine powder to prepare a slurry, the water-soluble copolymerizing solvent is convenient, because this solvent is completely uniformly mixed with the binder and it is thus unnecessary to remove the used solvent later. Examples of such water-soluble copolymerizing solvents include lower alcohols such as methanol, ethanol, isopropanol, n-propanol, lower ketones such as acetone, methyl ethyl ketone, methyl isobutyl ketone and diethyl ketone, lower esters such as 1,4-dioxane, 1,3-dioxane and tetrahydrofurane.

As the polymerization initiator mentioned above, a so-called radical polymerization initiator is usable in the present invention. Examples of such initiators include peroxides, for example, ketone peroxides such as methyl ethyl ketone peroxide and methylcyclohexanone peroxide, peroxyketal such as 2,2-bis(t-butylperoxy)cyclohexane and 2,2-bis(t-butylperoxy)butane, hydroperoxide, dialkyl peroxides such as di-t-butyl peroxide, t-butylcumyl peroxide and dicumyl peroxide, and dialkyl peroxide such as acetyl peroxide and benzoyl peroxide. Besides these peroxides, azobisisobutyronitrile can also be used.

The polymerization may be carried out at a suitably selected temperature within the range of ordinary temperature to 150° C., but is preferably accomplished at a level of the boiling point of the polymerizing solvent or lower from an industrial standpoint, since no pressurizing operation is required at such a temperature. The polymerization can be carried out in accordance with, for example, a manner of first placing materials and, if desired, the solvent in a reactor and gradually adding the polymerization initiator thereto, or another manner of first placing the solvent alone in the reactor and gradually adding the materials and the polymerization initiator thereto. Polymerization time suffices generally within the range of 6 to 30 hours, depending upon polymerization temperature and concentration of the initiator.

The copolymer prepared in the above-mentioned procedure is then neutralized with a tertiary amine to render it water-soluble.

The amine to be used for the neutralization treatment of the present invention is a tertiary amine in which the total number of carbon atoms contained in three substituents on its nitrogen atom is within the range of 6 to 9. Examples of such usable amines include alkyl amines such as triethylamine, diethybutylamine and dimethylhexylamine as well as hydroxyalkylamines such as triethanolamine and triisopropanolamine in which hydroxyl groups are introduced into alkyl groups. The neutralization treatment with these amines permits the binder for ceramics of the present invention to be manufactured. When the total number of the carbon atoms therein is 5 or less, an amine odor from the prepared binder sometimes will be too awful to permit actual handling, and the dried green sheet product from such a binder will not have such a flexibility as can withstand a winding operation. When the total number of the carbon atoms therein is 10 or more, the obtained ceramic binder will be poor in water-solubility, so that the aqueous slurry thus obtained will be difficult to make uniform.

It is important that the amine mentioned above neutralizes 85 mol % or more of the carboxylic acid groups present in the resin. If the carboxylic acid groups remain in an amount in excess of 15 mol %, the molded product will be completely solidified and will not have any flexibility. This means that such a resin is not suitable for the sheet molding at all. Even if the amine is used in large excess in the neutralization process, no problem will occur, but in fact, its amount should naturally be limited to a moderate level, taking economy, operativeness, the peculiar smell of the amine and the like into consideration. Therefore, the amount of the amine to be used is preferably 1.2 equivalents or less to the carboxylic acid groups to be neutralized in practice. The neutralization by the use of the amine progress quantitatively. This fact permits easily accomplishing the neutralization treatment by adding a predetermined amount of the amine to the prepared resin solution. In general, the neutralization treatment can be perfectly carried out at the polymerization temperature of the resin polymerized for a period of 30 minutes to 3 hours.

The binder of the present invention can play its role sufficiently even when used alone, but a water-soluble plasticizer such as a water-soluble polyol can be further added thereto in order to vary the flexibility of the molded ceramic sheet. Such water-soluble polyols have high boiling points, and their examples include ethylene glycol, diethylene glycol, triethylene glycol, propylene glycol and glycerine.

The copolymer of the present invention in which the neutralization has been made with the amine can be used as a binder in molding ceramics in which the slurry containing water as a dispersion medium is utilized.

The molecular weight of the copolymer is not so high as to cause gelling when the copolymer is dissolved in water. Therefore, the average molecular weight range of the present copolymer is usually from about 500 to about 15,000, determined by gel permeation chromatography.

The sinterable inorganic powders of the present invention includes such as alumina, magnesia, zirconia, beryllia, thoria and urania, carbides such as silicon carbide, titanium carbide, boron carbide and zirconium carbide, nitrides such s boron nitride, aluminum nitride and silicon nitride, borides such as titanium boride and zirconium boride, and silicides such as molybdenum silicide and boron silicide. Preferable sinterable inorganic powders are the above sinterable inorganic powders.

Now, reference will be made to a molding method of the ceramics in which the ceramic slurry containing water as a dispersion medium is utilized. The copolymer of the present invention in which the neutralization has been made with the amine is added to a powder of the sinterable material just mentioned in a proper amount in compliance with a kind of sinterable material and its grain size. Generally, the neutralized copolymer is blended with the sinterable inorganic powder in an amount of 1 to 50% by weight based on the sinterable inorganic powder. The resultant mixture is diluted with water until a moderate viscosity is reached, and it is kneaded by means of a kneader such as a sand mill, a ball mill, an attritor or a roll mill in order to render it a slurry. In this case, a water-soluble organic solvent, if necessary, may be added thereto with water. Further, together with the above-mentioned plasticizer, there may be added thereto auxiliaries such as leveling agent, defoamer, silane coupling agent and sintering assistant.

The aqueous slurry prepared in the abovementioned manner is then applied onto a substrate comprising a metallic sheet or a plastic sheet by means of a film thickness-adjustable coater, for example, a blade coater, a roll coater or a flow coater, and after drying to eliminate a substantial amount of water contained in the slurry, it is released therefrom to obtain a green sheet. In this sheet molding process, the copolymer of the present invention in which the neutralization has been made with the amine is generally added to the sinterable inorganic powder in an amount of 1 to 10% by weight based on the weight of the powder. The prepared green sheets are further cut, and punched to a given shape of a product. The operations of cutting and punching are very easily conducted because the green sheet of the present invention is flexible and has adequate mechanical strength.

Afterward, the sheets are fed to a heating oven having a temperature in the range of about 600° to 2000° C. to sinter the sinterable inorganic powder. Thereby the ceramic sheets as sintered products are obtained.

During the sintering, the binder of the present invention is thoroughly decomposed with no carbon deposit and does not exist in the sintered product even in the form of carbon. When carbonaceous materials remain in the sintered product, the mechanical properties of the sintered product are greatly deteriorated.

If desired, conductive circuits, parts, terminals and the like may be put on the green sheets or inserted to between the laminated sheets. At times, the green sheets may be printed.

The above-mentioned slurry can be applied to a sludge-casting molding method in which its molding is accomplished by casting it in a gypsum mold or the like.

Moreover, the above-mentioned slurry can also be applied to a powder-pressing molding method in which the slurry is dried by a spray dryer to be granulated, followed by pressing. This powder-pressing molding method requires the slurry which is prepared by adding 1 to 40% by weight of the amine-neutralized copolymer of the present invention based on the weight of the ceramic powder.

The present invention will be described in reference to the following examples, where, unless otherwise indicated, every "part" means "part by weight".

EXAMPLE 1

A mixture of 73.1 parts of n-butyl acrylate, 28.1 part of methacrylic acid, 11.25 parts of styrene and 0.1 part of a peroxide (tradename Perbutyl O, Nippon Oils & Fats Co., Ltd.) was added dropwise to 112.5 parts of boiling isopropyl alcohol as a polymerizing solvent over 2 hours. After the dropwise adding, stirring was continued at a constant temperature for 5 hours. The resultant reaction solution was cooled to room temperature and 48.7 parts of triethanolamine were then added thereto in order to accomplish neutralization. Afterward, isopropyl alcohol was distilled off from this solution under reduced pressure to obtain a water-soluble resin. The obtained resin was freely dissolved in water.

To 100 parts of an alpha alumina powder (tradename AM-021, Sumitomo Aluminum Seiren Co., Ltd.), 4 parts of the thus obtained resin and 45 parts of ion-exchanged water were added, and they were kneaded by a ball mill for about 10 hours in order to prepare a slurry, followed by defoaming.

A kneaded material sheet was formed from this slurry in a doctor blade manner and was then subjected to a natural drying treatment for 2 hours. Afterward, the sheet was dried at 110° C. for 2 hours to obtain a sheet having smooth surfaces.

This sheet possessed punchable elastic properties, and measurement made it apparent that the sheet had a density of 2.40 (g/cm$^3$).

Further, 23 parts of ion-exchanged water were added to 50 parts of the above prepared sheet, and stirring was then carried out for about 8 hours by a ball mill to return the sheet to the slurry form again. After defoaming, a new sheet was prepared in the abovementioned manner. It was found that this sheet also had smooth surfaces, a similar flexibility and a density of 2.38 (g/cm$^3$). This fact means that the reproduction of the sheet is possible.

On the other hand, the resultant reaction solution was neutralized fully with aqueous ammonia. The flexibility of the sheet obtained by this binder was not good. Further the reproduction of the sheet was impossible.

EXAMPLE 2

A water-soluble resin was prepared in the same procedure as in Example 1 with the exception that isopropanol alcohol which was a polymerizing solvent was not removed. The resin was kneaded with an alumina powder in the following proportion:

| | |
|---|---|
| Alumina powder | 100 parts |
| Resin solution | 7 parts |
| (4.1 parts as resin content) | |
| Ion-exchanged water | 45 parts |

These materials were kneaded in the same procedure as in Example 1 to prepare a sheet. This sheet was smooth and flexible and had a density of 2.39 (g/cm$^3$), as in Example 1. Its reproduction was also possible.

EXAMPLES 3 TO 6

The same procedure as in Example 1 was repeated with the exception that 1,4-dioxane (112.5 parts) was used as a polymerizing solvent or a polymerizing solvent was not used and methacrylic acid was replaced with acrylic acid (23.5 parts) in order to form a sheet, and its reproduction was then carried out in a similar manner. In all the cases, good sheets were prepared as shown in the following table:

| | Example | | | |
|---|---|---|---|---|
| | 3* | 4* | 5** | 6** |
| Polymerizing solvent | Removed | Removed | Present | Present |
| Reproduction of sheet | Before reproduced | After reproduced | Before reproduced | After reproduced |
| Density (g/cm$^3$) | 2.31 | 2.33 | 2.36 | 2.34 |
| Tensile strength (g/mm$^2$) | 46 | 42 | 44 | 43 |
| Properties | Smooth, flexible | Smooth, flexible | Smooth, flexible | Smooth, flexible |

*The binder added to the alumina powder contains nopolymerization solvent. It was removed under reduced pressure.
**The binder added to the alumina powder contains polymerization solvent, i.e., it was not removed under reduced pressure.

EXAMPLE 7 to 11

The same procedure as in Example 1 was repeated using reaction solvents, α,β-unsaturated carboxylic acids and vinyl compounds shown in the following Table 1 in order to synthesize organic binders, and evaluation was made on formed ceramic sheets. The results indicated that all the sheets were reproducible, smooth and flexible, and had a high density.

Besides, all binders were freely dissolved in water.

TABLE 1

| | Example | | | | |
|---|---|---|---|---|---|
| | 7 | 8 | 9 | 10 | 11 |
| Polymerizing solvent | Dioxane (112) | Dioxane (112) | Dioxane (112) | Ethyl acetate (112) | Ethyl acetate (112) |
| $\alpha\beta$-Unsaturated carboxylic acid | Methacrylic acid (28) | Methacrylic acid (28) | Methacrylic acid (28) | Acrylic acid (24) | Acrylic acid (24) |
| Vinyl compound | n-Butyl-acrylate (85) | 2-Ethyl-hexyl acrylate (85) | n-Butyl-acrylate (57) | n-Butyl-acrylate (65) | 2-Ethyl-acrylate (65) |
| | | | 2-Ethyl-hexyl acrylate (28) | $\alpha$-Methyl-styrene (20) | Methyl meth-acrylate (20) |
| Evaluation of sheet | | | | | |
| Before reproduced | | | | | |
| Density (g/cm$^3$) | 2.32 | 2.19 | 2.26 | 2.37 | 2.38 |
| Tensile strength (g/mm$^2$) | 29 | 27 | 21 | 37 | 43 |
| After reproduced | | | | | |
| Density (g/cm$^3$) | 2.41 | 2.11 | 2.29 | 2.41 | 2.31 |
| Tensile strength (g/mm$^2$) | 31 | 35 | 19 | 34 | 41 |

EXAMPLES 12 TO 16 AND COMPARATIVE EXAMPLES 1 AND 2

A mixture of n-butyl acrylate, methacrylic acid and 0.1 part of azobisisobutyronitrile which was a polymerization initiator was added dropwise to 100 parts of boiling isopropyl alcohol over 2 hours. After dropwise adding, stirring was continue at the same temperature for 5 hours. The resultant reaction solution was cooled to room temperature and triethanolamine was then added thereto in order to accomplish the neutralization treatment.

For the thus prepared resin solution, evaluation was made in the same manner as in Example 2. The results are shown in Table 2.

TABLE 2

| | Example | | | | | Comparative Example | |
|---|---|---|---|---|---|---|---|
| | 12 | 13 | 14 | 15 | 16 | 1 | 2 |
| Methacrylic acid (parts) | 5 | 10 | 15 | 20 | 35 | 40 | 2 |
| n-Butyl acrylate (parts) | 95 | 90 | 85 | 80 | 65 | 60 | 98 |
| Amount of triethanol-amine | 9 | 17 | 26 | 35 | 61 | 69 | 4 |
| Evaluation of sheet | | | | | | | |
| Density (g/cm$^3$) | 2.33 | 2.27 | 2.31 | 2.34 | 2.41 | 2.44 | — |
| Tensile strength (g/mm$^2$) | 24 | 32 | 31 | 28 | 37 | 48 | — |
| Properties | Flexible | Flexible | Flexible | Flexible | Slightly hard but resistant to bending | Broken when bent | Uniform slurry was not prepared |

EXAMPLE 17 TO 19

Copolymerization was carried out by the same procedure as in Example 15, and various amine treatments then followed. The resultant resin solutions were used in the same manner as in Example 2 to prepare ceramic sheets.

| | Example | | |
|---|---|---|---|
| | 17 | 18 | 19 |
| Amine treatment (parts)* | Triethyl-amine (23) | Tri(iso-propanol)-amine (45) | Triethanol amine (17) |
| | | | Dimethyl-hexyl-amine (15) |
| Evaluation of sheet | Having slight odor, but flexible and smooth | Excellent in flexibility | Excellent in flexibility |

*Parts of amines required to accomplish 100% of neutralization.

EXAMPLE 20 TO 22 AND COMPARATIVE EXAMPLE 3

Copolymerization was carried out by the same procedure as in Example 15, and an amine treatment was carried out using triethanolamine. Sheets were prepared from the resultant resin solutions in the same manner as in Example 2.

|  | Comparative Example 3 | Example 20 | Example 21 | Example 22 |
|---|---|---|---|---|
| Amount of triethanol amine (parts)* | 28 | 31 | 42 | 69 |
| Evaluation of sheet | Broken when bent | Slightly hard, but resistant to bending | Flexible | Flexible |

*Parts of the amine used for neutralization.

EXAMPLE 23

A mixture of 7 parts of 2-hydroxyethyl methacrylate, 66.1 parts of n-butyl acrylate, 28.1 parts methacrylic acid, 11.25 parts of styrene and 0.1 part of a peroxide (tradename Perbutyl O, Nippon Oils & Fats Co., Ltd.) was added dropwise to 112.5 parts of boiling isopropyl alcohol over 2 hours. After dropwise adding, stirring was continued at the same temperature for 5 hours. The resultant reaction solution was cooled to room temperature and 48.7 parts of triethanolamine were then added thereto for neutralization. Thereafter, isopropyl alcohol was distilled off from this solution under reduced pressure to obtain a water-soluble resin. The obtained resin was freely dissolved in water.

To 100 parts of an alumina powder (tradename AM-21, Sumitomo Aluminum Seiren Co., Ltd.), 4 parts of the thus obtained resin and 45 parts of ion-exchanged water were added, and they were kneaded by a ball mill for about 10 hours in order to prepare a slurry, followed by defoaming.

A kneaded material sheet was formed from this slurry in a doctor blade manner and was then subjected to a natural drying treatment for 2 hours. Afterward, the sheet was dried at 110° C. for 2 hours to obtain a green sheet product having smooth surfaces.

The results of measurement on the basis of JIS-K7113 indicated that the above obtained green sheet had a mechanical strength of 82.5 g/mm$^2$.

This sheet possessed punchable elastic properties and had a density of 2.58 (g/cm$^3$) according to measurement.

Further, 23 parts of ion-exchanged water were added to 50 parts of the above prepared green sheet, and kneading was then carried out for about 8 hours by a ball mill to return the sheet to a slurry again. After defoaming, a new sheet was prepared therefrom in the above-mentioned manner. It was found that the new sheet had smooth surfaces, a similar flexibility and a density of 2.55 (g/cm$^3$). This fact means that the reproduction of the sheet is possible.

EXAMPLE 24

A water-soluble resin was prepared in the same procedure as in Example 23 with the exception that isopropanol alcohol which was a polymerizing solvent was not removed. The resin was kneaded with an alumina powder in the following proportion:

| Alumina powder | 100 parts |
|---|---|
| Resin solution (4.1 parts as resin content) | 7 parts |
| Ion-exchanged water | 45 parts |

These materials were kneaded by the same procedure as in Example 23 to prepare a sheet. This sheet was likewise smooth and flexible and had a density of 2.61 (g/cm$^3$).

EXAMPLES 25 TO 28

The same procedure as in Example 23 was repeated using reaction solvents, $\alpha,\beta$-unsaturated carboxylates, $\alpha,\beta$-unsaturated carboxylic acids and vinyl compounds shown in Table 3 in order to synthesize binders for ceramics, and after neutralization, evaluation was made on ceramic sheets formed. The results indicated that all the sheets were reproducible, smooth and flexible and had a great strength. The results of the evaluation are also shown in Table 3.

Besides, all binders obtained were freely dissolved in water.

TABLE 3

|  | Example | | | |
|---|---|---|---|---|
|  | 25 | 26 | 27 | 28 |
| Reaction solvent (parts) | Dioxane (112.5) | Dioxane (112.5) | Ethyl acetate (112.5) | Ethyl acetate (112.5) |
| $\alpha\beta$-Unsaturated carboxylate (parts) | 2-Hydroxy-propyl methacrylate (22.5) | 2-Hydroxy-propyl methacrylate (22.5) | 2-Hydroxy-ethyl acrylate (6.5) | 2-Hydroxy-ethyl acrylate (56) |
| $\alpha\beta$-Unsaturated carboxylic acid (parts) | Acrylic acid (17) | Methacrylic acid (22.5) | Methacrylic acid (22.5) | Methacrylic acid (22.5) |
| Vinyl compound (parts) | Methyl-methacrylate (73) | n-butyl-acrylate (22.5) $\alpha$-Methyl-styrene (45) | Ethyl-acrylate (83.5) — | 2-Ethyl-hexyl acrylate (11.5) Styrene (7) |
| Amine (parts) | Tri-ethanol-amine (35.2) | Triiso-propanol-amine (50) | Triiso-propanol-amine (45) | Tri-ethanol-amine (59) Triethyl-amine (4.5) |
| Evaluation of sheet | | | | |
| Before reproduced | | | | |
| Density (g/cm$^3$) | 2.46 | 2.52 | 2.61 | 2.49 |
| Tensile strength (g/mm$^2$) | 64 | 80 | 85 | 93 |
| After reproduced | | | | |
| Density (g/cm$^3$) | 2.48 | 2.52 | 2.55 | 2.45 |
| Tensile strength (g/mm$^2$) | 67 | 78 | 78 | 88 |

COMPARATIVE EXAMPLE 4

The procedure of Example 23 was repeated with the exception that n-butyl acrylate was replaced with 73.6 parts of 2-hydroxypropyl methacrylate and the amount of styrene was 4 parts in order to carry out copolymerization. After neutralization, a slurry was formed by the use of the resultant resin. However, this slurry was not uniform. Further, a sheet which was made from the aforesaid slurry was also not uniform.

COMPARATIVE EXAMPLE 5

Copolymerization was accomplished in the same manner as in Example 25 with the exception that the amount of acrylic acid was 3 parts. Afterward, neutralization was carried out by using 6.2 parts of triethanolamine. The resultant resin was insoluble in water.

COMPARATIVE EXAMPLE 6

Copolymerization was accomplished in accordance with the same procedure as in Example 26 with the exception that the amount of triisopropanolamine was 35 parts. After neutralization, a sheet was manufactured by using the resultant resin, but it was poor in flexibility and was thus easily broken.

EXAMPLE 29 (SINTERING)

The green sheets obtained in Examples 1 to 28 and Comparative Examples 1 to 6 were respectively sintered in a heating oven at 1000° C.

The respective surfaces of the sintered sheets were the same as the surfaces before sintering. That is, the smoother sintered sheets were produced from the smoother green sheet.

This tendency was also observed in the density between the green sheet and the sintered sheet.

Carbonaceous materials were not detected in the sintered sheets of the present invention by determination of sintered sheet color.

What is claimed is:

1. A method for producing a sintered ceramic sheet which comprises molding an aqueous slurry composition which contains a sinterable inorganic powder and 1 to 50% by weight of a water-soluble binder based on the weight of the inorganic powder to a sheet-like form, drying the molded slurry to a green sheet and sintering the green sheet by heating, said water-soluble binder comprising a copolymer of:

(A) 5 to 45 mol % of acrylic acid, methacrylic acid or mixtures thereof;

(B) 1 to 95 mol % of at least one of vinyl compound represented by the formula (I) or (II)

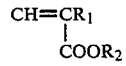  (I)

wherein $R_1$ is a hydrogen atom or a methyl group and $R_2$ is an alkyl group having 1 to 18 carbon atoms;

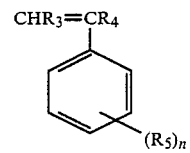  (II)

wherein each of $R_3$, $R_4$ and $R_5$ is a hydrogen atom, a methyl group or an ethyl group, and the total number of carbon atoms of $R_3$, $R_4$ and $(R_5)_n$ is a 2 or less and n is an integer of 0 to 2; and (C) 0 to 54 mol % of at least one α,β-unsatuated carboxylate selected from acrylates and methacrylates containing hydroxyl groups represented by the formula (III)

  (III)

wherein $R_6$ is a hydrogen atom or a methyl group and $R_7$ is a hydroxy allsyl group having 2 to 4 carbon atoms;

at least 85 mol % of carboxyl groups contained in said copolymer being neutralized with a 6 to 9 carbon atom tertiary amine.

2. The method according to claim 2, wherein the vinyl compound represented by said general formula (II) is styrene, α-methylstyrene or vinyltoluene.

3. The method according to claim 2, wherein said tertiary amine is triethylamine, dimethylhexylamine, triethanolamine or triisopropanolamine.

4. The method according to claim 1, wherein the vinyl compound represented by said formula (I) is methyl methacrylate, ethyl acrylate, n-butyl acrylate or 2-ethylhexyl acrylate.

5. The method according to claim 1, wherein the αβ-unsaturated carboxylate represented by said formula (III) is 2-hydroxyethyl methacrylate, 2-hydroxypropyl methacrylate or 2-hydroxyethyl acrylate.

6. The method according to claim 1, wherein the amount of (C) is 0 to 40 mol %.

7. The method according to claim 6, wherein the amount of (C) is 1 to 40 mol %.

8. The method according to claim 7, wherein the vinyl compound represented by said general formula (II) is styrene, α-methylstyrene or vinyltoluene.

9. The method according to claim 8, wherein said tertiary amine is triethylamine, dimethylhexylamine, triethanolamine or triisopropanolamine.

10. The method according to claim 9, wherein the vinyl compound represented by said formula (I) is methyl methacrylate, ethyl acrylate, n-butyl acrylate or 2-ethylhexyl acrylate.

11. The method according to claim 10, wherein the α,β-unsaturated carboxylate represented by said formula (III) is 2-hydroxyethyl methacrylate, 2-hydroxypropyl methacrylate or 2-hydroxyethyl acrylate.

* * * * *